United States Patent [19]

Tang

[11] Patent Number: 5,360,343
[45] Date of Patent: Nov. 1, 1994

[54] CHINESE CHARACTER CODING METHOD USING FIVE STROKE CODES AND DOUBLE PHONETIC ALPHABETS

[76] Inventor: Jianmin Tang, No. 13 Beilu, Zengcheng Town, Zengcheng Town, Guangzhou, China

[21] Appl. No.: 3,788

[22] Filed: Jan. 13, 1993

[30] Foreign Application Priority Data

Jan. 15, 1992 [CN] China ................. 92106366

[51] Int. Cl.$^5$ ............................................. G09B 19/00
[52] U.S. Cl. .................................. 434/118; 434/157; 364/419.09; 341/22; 400/110
[58] Field of Search ............... 434/118, 156, 157, 159, 434/162, 167, 169, 185, 307, 308; 364/419, 419.03, 419.09; 395/2, 150, 425; 341/22, 28; 400/110, 484; 345/171, 172

[56] References Cited

U.S. PATENT DOCUMENTS

| | | | |
|---|---|---|---|
| 4,484,305 | 11/1984 | Ho | 364/419 |
| 4,505,602 | 3/1985 | Wong | 364/419 X |
| 4,684,926 | 8/1987 | Yong-Min | 341/28 |
| 4,698,758 | 10/1987 | Larsen | 364/419 |
| 4,920,492 | 4/1990 | Wang | 364/419 |
| 4,937,745 | 6/1990 | Carmon | 364/419 |
| 5,047,932 | 9/1991 | Hsieh | 364/419 |
| 5,119,296 | 6/1992 | Zhung et al. | 364/419 |
| 5,164,900 | 11/1992 | Bernath | 364/419 |
| 5,218,538 | 6/1993 | Zheng | 341/22 X |

FOREIGN PATENT DOCUMENTS

| | | |
|---|---|---|
| 87100210 | 7/1988 | China . |
| 901054712 | 2/1991 | China . |
| 891066284 | 3/1991 | China . |
| 901076031 | 5/1991 | China . |
| 90108803 | 2/1992 | China . |

Primary Examiner—Richard J. Apley
Assistant Examiner—Joe H. Cheng
Attorney, Agent, or Firm—Ladas & Parry

[57] ABSTRACT

The present invention is a method for inputting Chinese characters into a computer system, by using the 26 alphabet keys on a standard English keyboard to arrange Chinese consonants, vowel codes, codes of the initial two strokes and the last two strokes of a Chinese character, and inputting Chinese characters or phrases according to their Pinyin (phonetic symbol) and writing sequence. The present invention provides both the input method which is mainly based on consonants and vowels, secondly on the initial two strokes and the last two strokes of the characters and the input method which is mainly based on the initial two strokes and the last two strokes of the characters, and secondly on their consonants and vowels.

4 Claims, 2 Drawing Sheets

Fig. 1

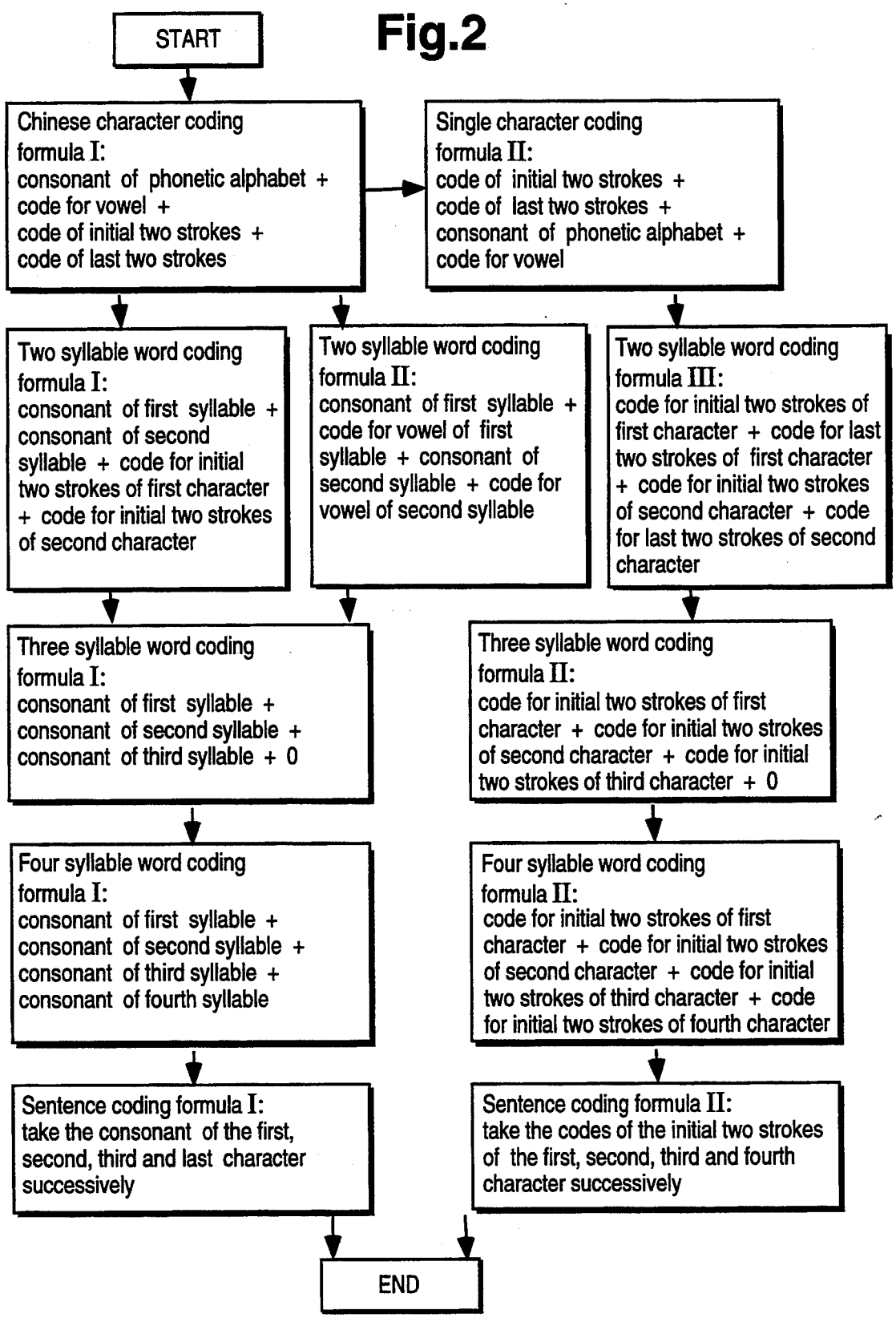

CHINESE CHARACTER CODING METHOD USING FIVE STROKE CODES AND DOUBLE PHONETIC ALPHABETS

BACKGROUND OF THE INVENTION

1. Field of the Invention

The present invention relates to a Chinese character coding method, and more particular, to a Chinese character coding method using five stroke codes and double phonetic alphabets.

2. Description of the Related Art

Along with the rapid popularization of electronic computer, numerous Chinese character coding methods and systems for computers have been developed. However, the existing methods and systems are either easy to learn but inefficient (such as pinyin or phonetic coding scheme) or hard to learn but efficient (such as Wang yongmin's WBZX, i.e. Wu Bi Zi Xing, or five stroke character shape coding scheme). Therefore, computer users need a Chinese character coding scheme that is easy to learn and efficient.

SUMMARY OF THE INVENTION

The object of the invention is to provide a Chinese character coding method that is easy to learn and efficient.

The Chinese character coding method using five stroke codes and double phonetic alphabets according to the present invention allocates four English alphabets to every single Chinese character, wherein the first two alphabets represent an initial consonant and a code of vowel, respectively, and the last two alphabets represent codes of initial two strokes and last two strokes, respectively.

The Chinese character coding method according to the present invention is an intelligent Chinese character coding method which is based on the three foundation stones, namely, CCDOS (Chinese Character Disk Operating System), Five-Stroke Character Shape, and Double Phonetic Alphabets and Double Pronunciation. It uses the method of "double phonetic alphabets and double pronunciation" to represent the pronunciation of the character. It also uses the regular compound of the five strokes of Chinese characters (instead of the root codes of the input method of CCDOS) to represent the character shape. The five basic strokes of Chinese characters are arranged according to "the Directions of Strokes Searching Table" in "Ci Hai", a Chinese dictionary. The initial two strokes and their order observed in calligraphy of a Chinese character are referred to the "Strokes Searching Table" in "Ci Hai" while the last two strokes are according to the normal calligraphy habits. Meanwhile, it is the principle for stroke codes to be identified easily (e.g. the initial two stroke codes of "𤰾" are "丿 一" and its last two stroke codes are " 乙 丿"). An advanced keyboard installation is adopted with letter location codes of "five stroke character shape" and punctuation.

The scheme has broken through the fetters of the traditional way of thinking of which Chinese character codes are arranged by radicals and roots. On the basis of inheriting the traditional excellent Chinese character codes, the bold innovation and optimum combination carry forward good points and avoid short comings, and thus enable the intelligent Chinese character coding method to leap to a new degree.

The present invention has the following merits:

1) The coding rules are very regular without much to memorize. They are not arranged by "radicals" or "roots". It is very easy to judge according to the pronunciation (of syllables) and the writing (of characters).

2) The coding capacity is very large. The method of selecting codes is very regular. The input operation is convenient, simple, quick and flexible. The "words store" can select codes according to figures structure and logical conditions.

3) The coding pronunciation of character or a word can be expressed by the initial letter (the shape can be expressed to some certain degree, too).

4) The existing, developing intellectual technology can be utilized to combine the "pronunciation, shape, meaning, character, word, sentence" of the Chinese language for further development of the basic codes of shape and pronunciation.

5) It has improved the computer input techniques of Chinese characters which is difficult to learn, difficult to use to the direction of widespread, popular and high efficiency. It is one of the most excellent intellectual basic coding method of Chinese characters.

BRIEF DESCRIPTION OF THE DRAWINGS

Other features and advantages of the present invention will become apparent when the following description is read in conjunction with the accompanying drawings in which:

FIG. 1 is a diagram showing a coding scheme layout on a keyboard according to the present invention.

FIG. 2 is a flow chart showing the coding scheme according to the present invention.

DETAILED DESCRIPTION OF THE PREFERRED EMBODIMENTS

Figure 1:
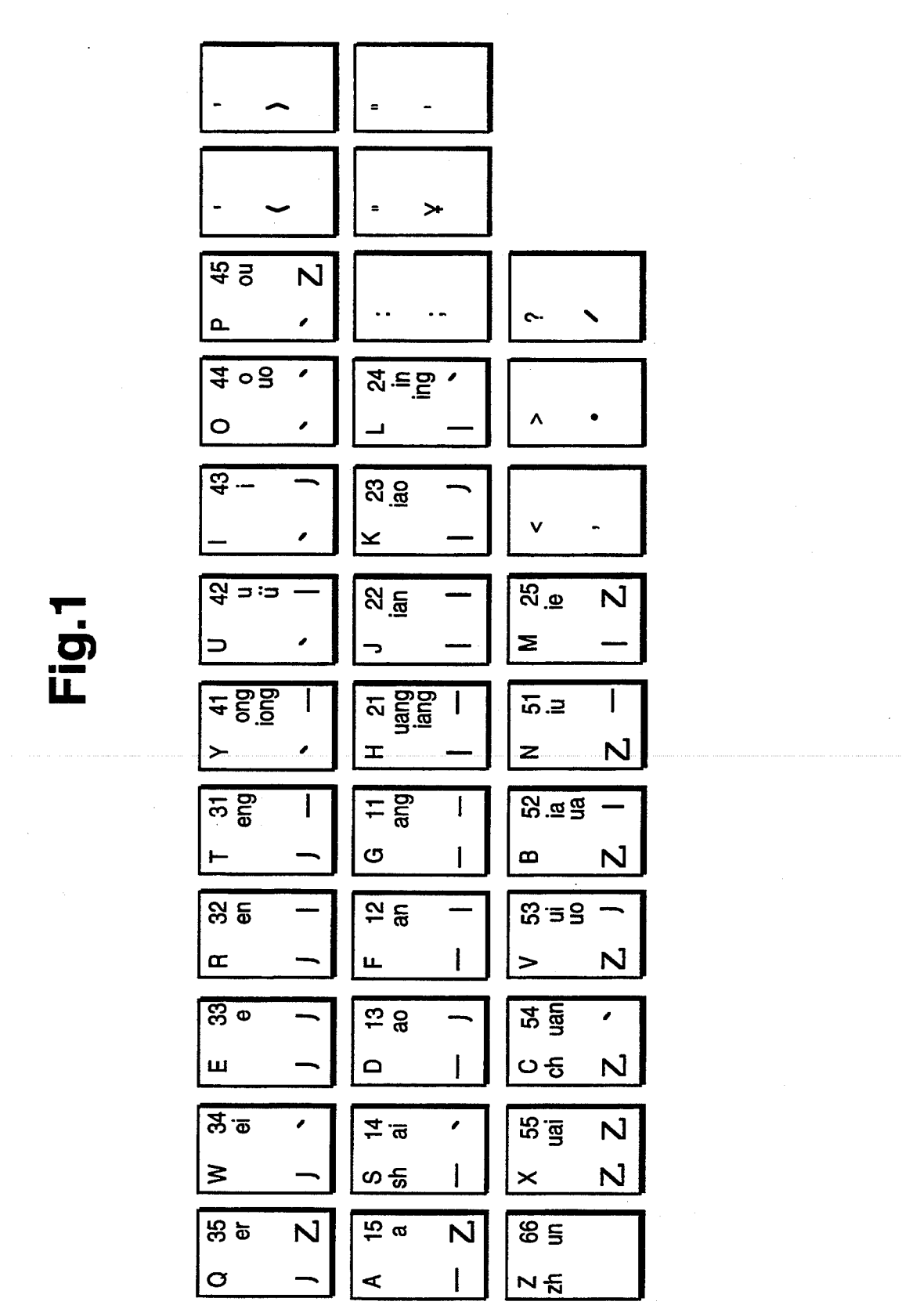

FIG. 1 shows a primary keyboard layout for inputting Chinese characters into a computer using the coding scheme of this invention.

The location codes of "five-stroke character shape scheme" are used as the coding of Chinese phonetic alphabets. Those location codes are marked on the upper right corner of each key.

The 23 initial consonants of the Chinese phonetic alphabets (including Y, W) are in conformity with the English letters on the standard keyboard, "zh", "ch", "sh" are merged into "z", "c", "s", and displayed on the keyboard. There are three merits for the merger, i.e. 1) to reduce codes, 2) to save memory, 3) to correct accent errors for people from the South who cannot normally tell "zh" from "z", "ch" from "c", and "sh" from "s". When a vowel is an independent syllable, the consonants are "A", "E", and "O", etc. It can solve the problem of the long coding of the input spelling of phonetic alphabets. Besides, it is good for the codes of words to be selected regularly from the word store.

The coding of vowels is based upon the Scheme of "Double Phonetic Alphabets and Double Pronunciation" with very little alteration.

According to "the Directions of Strokes Searching Table" in "Ci Hai" (a Chinese dictionary), the five strokes are arranged in the following order: (1) horizontal strokes (— and 一), (2) vertical stroke ( 丨 ), (3) left-falling stroke ( 丿 ), (4) dot strokes or right-falling stroke (丶 and ⟍), and (5) turning strokes (乙, including stroke shapes with hooks of winding strokes). The initial strokes and their order are according to "The Strokes Searching Table" In "Ci Hai". The last two strokes are according to normal writing habits with reference to the easy-to-be-identified principle (e.g. the last two strokes of " 线 " are " 乙丿 ").

Therefore, the codes for the initial two and last two strokes of Chinese characters are:

——, —丨, —丿, —丶, —乙, 丨—, 丨丨, 丨丿,

丨丶, 丨乙, 丿—, 丿丨, 丿丿, 丿丶, 丿乙, 丶—,

丶丨, 丶丿, 丶丶, 丶乙, 乙—, 乙丨, 乙丿, 乙丶, 乙乙.

There are 25 combinations of the five basic strokes. They are arranged to correspond with locations codes as follows: 11, 12, 13, 14, 15; 21, 22, 23, 24, 25; 31, 32, 33, 34, 35; 41, 42, 43, 44, 45; 51, 52, 53, 54, 55 which correspond to the keys of G, F, D; S, A,; H, J, K, L, M,; T, R, E, W, Q,; Y, U, I, O, P,; N, B, V, C, X as shown in FIG. 1.

Further, the letter "O" is used as the fourth code for three syllable or character words.

According to the present invention, the coding procedures of 6763 commonly used Chinese characters and the actual procedure of input operation into a computer are first, to distinguish these characters with 23 initial consonants of the phonetic alphabets (including Y, W); secondly, to distinguish these characters with the codes of the 26 groups of single or compound vowels; thirdly, to distinguish these characters with the codes of initial two strokes of the 25 Chinese stroke combinations; finally, distinguish these characters with the codes of last two strokes of the 25 Chinese stroke combinations.

The following is the description of each block in FIG. 2.

For use in the present method of inputting Chinese characters into a computer system, the coding formula of Chinese characters is:

Initial consonant of phonetic alphabet+code of single or compound vowels+codes of initial two strokes of Chinese character+code of last two strokes of Chinese character.

Thus, the maximum capacity of codes of individual characters is:

23 * 26 * 25 * 25=370,000 (codes). The chance for a repeated code is very limited. Even these very few repeated codes can be dealth with the rule of "common ones first."

The selecting rule of the codes for two syllable or character words is:

the initial consonant of the first character (syllable)+the initial consonant of the second character (syllable)+the initial two strokes of the first character+the initial two strokes of the second character.

Thus, the coding capacity of two syllable or character words is about: $24^4 = 330,000$ (codes).

The selecting rule of the codes for three syllable or character words is:

the initial consonant of the first character (syllable)+the initial consonant of the second character (syllable)+the initial consonant of the third character+the alphabet "O."

The coding capacity of three syllable or character words is: $23^3 = 10,000$ (codes). Because "O" is used as the fourth code of three syllable words, thus it will not normally be identical with individual characters, two syllable words or four syllable words.

The coding rule for four syllable or character words is taking the initial four consonant alphabets from the four syllables successively.

The coding capacity of four syllable words is about: $23^4 = 280,000$ (codes).

The coding rules of four syllable words can be extended to the coding of a sentence. Please refer to the coding regulations hereinafter for details.

CODING REGULATIONS

The detailed coding regulations of this invention are explained by way of examples given hereinbelow. The coding forms are illustrated in FIG. 2.

1. Coding for single or individual characters:

A. Individual Chinese Character Coding Formula One is:

consonant of phonetic alphabet+code for vowel+initial two strokes of the Chinese character+last two strokes of the Chinese character.

Individual Chinese Character Coding Formula Two is:

initial two strokes of the Chinese character+last two strokes of the Chinese character+consonant of phonetic alphabet+code for vowel.

|  | FIVE STROKE & DOUBLE PHONETIC ALPHABET CODES | | | | ALPHA-BET CODES | LOCATION CODES |
|---|---|---|---|---|---|---|
| 1) | | | | | | |
| 音: yin | Y | L | 丶— | —— | Y L Y G | 41 24 41 11 |
| 星: xing | X | L | —— | 丨— | X L G H | 55 24 11 21 |
| 知: zhi | Z | I | —丨 | —— | Z I F G | 66 43 12 11 |
| 官: guan | G | C | 丶 | 丿乙 | G C C Q | 11 54 54 35 |
| 2) | | | | | | |
| 音: yin | 丶— | —— | | Y L | Y G Y L | 41 11 41 24 |
| 星: xing | —— | 丨— | | X L | G H X L | 11 21 55 24 |
| 知: zhi | —丨 | —— | | Z I | F G Z I | 12 11 66 43 |
| 官: guan | 丶 | 丿乙 | | G C | C Q G C | 54 35 11 54 |

B. Coding for Individual Characters of Vowels:

| 嗄 (a) | 哎 (ai) | 安 (an) | 肮 (ang) |
|---|---|---|---|
| 凹 (ao) | 额 (e) | 而 (er) | 欧 (ou) |

The coding formulas of these Chinese characters are as follows:

A+code for vowel+codes of initial two strokes of the Chinese character+codes of last two strokes of the Chinese character;

E+code for vowel+codes of initial two strokes of the Chinese character+codes of last two strokes of the Chinese character; and O+code for vowel+codes of initial two strokes of the Chinese character+codes of last two strokes of the Chinese character.

C. The coding for Chinese characters which have less than four strokes is as follows:

a) There are only two Chinese characters which have one stroke. They are:"—" and " 乙". Their codes are:

Y I —— —— and Y I zz zz b) As for the two stroke Chinese characters, their initial two strokes are their last two strokes. Therefore, their codes will be:

| FIVE STROKE & DOUBLE PHONETIC ALPHABET CODES | | | | ALPHABET CODES | | | | LOCATION CODES | | | |
|---|---|---|---|---|---|---|---|---|---|---|---|
| 儿: | E | Q | 丿乙 | 丿乙 | E | Q | Q | Q | 33 | 35 | 35 | 35 |
| 习: | D | K | 乙- | 乙- | D | K | N | N | 13 | 23 | 51 | 51 | c) As for the three stroke Chinese characters, the middle stroke is the second initial stroke and the first last stroke. Therefore, their codes will be:

| FIVE STROKE & DOUBLE PHONETIC ALPHABET CODES | | | | ALPHABET CODES | | | | LOCATION CODES | | | |
|---|---|---|---|---|---|---|---|---|---|---|---|
| 工: | G | Y | 一丨 | 丨一 | G | Y | F | H | 11 | 41 | 12 | 21 |
| 久: | J | N | 丿乙 | 乙丶 | J | N | Q | C | 22 | 51 | 35 | 54 |

D. Input method example one: Inputting "浅" (Qian) under formula one above.

1) Select one code "Q" for its consonant.
Because 23 consonants are used to be the codes for 10 high frequency Chinese characters respectively the computer will display: Q: 1: 2: 3: 4: 5: 6: 7: 8: 9: 0:

If other consonants are inputted, the display will be
G: 1: 2: 3: 4: 5: 6: 7: 8: 9: 0:
H: 1: 2: 3: 4: 5: 6: 7: 8: 9: 0:
(The first characters can be inputted with the space bar).

2) Select two codes "QJ" for "浅" to further include its vowel code.
Display: 1: 2: 3: 4: 5: 6: 7:
8: ...浅... (Select to input).

3) Select three codes "QJ丶" for "浅" to further include codes for its two initial strokes.
Display: 1: 2: 3: 4:
(If there are no repeated codes, input with the space bar. If there are characters of repeated codes, select to input).

4) Select four codes "QJ丶丶乙丿" for "浅" to include codes for its last two strokes. The character is inputted automatically.
Display: 1. 浅

E. Input method example two inputting "浅" under formula two above.
1) Select two codes "丶丶乙丿" for its initial two strokes and last two strokes.
Display: 1: 2: 3: 4: 5: 6:
(Select to input).

2) Select three codes "丶丶乙丿Q" for its initial two strokes, last two strokes and consonant.
Display: 1. 浅
(If there are no repeated codes, input with the space bar. If there are characters of repeated codes, select to input).

3) Select four codes " 丶丶 乙丿 Q J". Then the character " 浅 " is entered automatically.
Display: 1. 浅

2. Coding for Two Syllable (or character) Words:
A. Formula One: (phonetics & strokes fast way)
consonant of the first syllable+consonant of the second syllable+codes for initial two strokes of the first syllable+codes for initial two strokes of the second syllable.

Formula Two: (double phonetics & sylables)
consonant of the first syllable+codes for the vowel of the first syllable+consonant of the second syllable+code of the vowel of the second syllable.

Formula Three: (five-stroke fast way)
codes for the initial two strokes of the first syllable+codes for the last two strokes of the first syllable+codes for the initial two strokes of the second syllable+codes for the last two strokes of the second syllable.

e.g.:
| FIVE STROKE & DOUBLE PHONETIC ALPHABET CODES | | ALPHABET CODES | LOCATION CODES |
|---|---|---|---|
| 人民 1) | :R M 丿丶 乙- | R M W N | 32 25 34 51 |
| 人民 2) | :R R M L | R R M L | 32 32 25 24 |
| 人民 3) | :丿丶 丿丶 乙- 乙- | W W N A | 34 34 51 15 |

B. Input method one for inputting " " under formula one.

1) Select two codes for the consonants of " 人民 " i.e. "R M".
Display: 1: 人民 2: 3: 人名 4: 人命 5: 人马 6: 任免 7: 任命
(Select to input)

2) Select three codes "R M 丿丶 for " 人民 ".
Display: 1:人民 2: 人打 3: 人名 4: 人会 5: 人马
(If there are characters of repeated codes, one can select to input. If there is no such repeated code, input with the space bar).

3) Select four codes "R M 丿丶 乙-" for " 人民 ".
Display: which are entered automatically.

C. Input method two for inputting "人民" under formula two.
Select four codes "R R M L".
Display: 1. 人民 which are entered automatically.

D. Input method three for inputting " 人民 " under formula three.
1) Select three codes " 丿丶丿乙- " for " 人民 ".
Display: 1: 2: 人民
(If there is no repeated code, input with the space bar. If there is any, select to input).

2) Select four codes "丿丶 乙- 乙- " for "人民".
Display: 1. 人民 which are entered automatically.

3. Coding for three syllable (or character) words.
Formula One:
consonant of the first syllable+consonant of the second syllable+consonant of the third syllable+O.
Formula Two: (five-stroke fast way)
codes for the initial two strokes of the first syllable+codes for the initial two strokes of the second syllable+codes for the initial two strokes of the third syllable+O.

e.g.:
| | FIVE STROKE & DOUBLE PHONETIC ALPHABET CODES | | ALPHABET CODES | | | | LOCATION CODES | | | |
|---|---|---|---|---|---|---|---|---|---|---|---|
| 1) | 计算机: | | J | S | J | O | 22 | 14 | 22 | 44 |
| | 新时代: | | X | S | D | O | 55 | 14 | 13 | 44 |
| | 大众化: | | D | Z | H | O | 13 | 66 | 21 | 44 |
| 2) | 计算机: | 丶乙丿--丨 | O | P | T | F | O | 45 | 31 | 12 | 44 |

-continued e.g.:

| | FIVE STROKE & DOUBLE PHONETIC ALPHABET CODES | | ALPHABET CODES | | | | LOCATION CODES | | | |
|---|---|---|---|---|---|---|---|---|---|---|
| 新时代： | ﹅ — ㅣ乙 丿 ㅣ | | O | Y | M | R | O | 41 | 25 | 32 | 44 |
| 大众化： | 一丿 丿 ﹅ 丿 ㅣ | | O | D | W | R | O | 13 | 34 | 32 | 44 |

(If three codes are selected without a repeated one, input with the space bar. If there is any repeated code, select to input).

4. Coding for four syllable (or character) words.
Formula One:
   consonant of the first syllable+consonant of the second syllable+consonant of the third syllable+consonant of the fourth syllable.
Formula Two: (five-stroke fast way)
   codes of the initial two strokes of the first syllable+codes of the initial two strokes of the second syllable+codes of the initial two strokes of the third syllable+codes of the initial two strokes of the fourth syllable.

e.g.:

| | FIVE STROKE & & DOUBLE PHONETIC ALPHABET CODES | ALPHABET CODES | | | | LOCATION CODES | | | |
|---|---|---|---|---|---|---|---|---|---|
| 1) | 中华民族： | Z | H | M | Z | 66 | 21 | 25 | 66 |
| | 奋飞富强： | T | F | M | J | 31 | 12 | 25 | 22 |
| | 国盐本箱： | J | Y | Q | J | 22 | 41 | 35 | 22 |
| 2) | 中华民族： ㅣ乙 丿 ㅣ Z— ﹅— | M | R | N | Y | 25 | 32 | 51 | 41 |
| | 奋飞富强： ﹅﹅ 乙丿 丿乙 ——  | O | V | Q | G | 44 | 53 | 35 | 11 |
| | 胡盐本箱： ﹅﹅ ﹅﹅ —乙 ﹅﹅ | O | O | A | O | 44 | 44 | 15 | 44 |

(If three codes are selected without a repeated one, input with the space bar. If there is any repeated code, select to input).

5. Coding formula for words with more than five syllables (or characters).
  1) Select the consonants of the first three and the last characters.
  2) Select codes of the initial two strokes of the first three and the last Chinese characters.

e.g.:

| FIVE STROKE & DOUBLE PHONETIC ALPHABET CODES | ALPHABET CODES | | | | LOCATION CODES | | | |
|---|---|---|---|---|---|---|---|---|
| 1) | | | | | | | | |
| (People's Republic of China) | | | | | | | | |
| 中华人民和国： | Z | H | R | G | 66 | 21 | 32 | 11 |
| (People's Liberation Army) | | | | | | | | |
| 中国人民解放军： | Z | G | R | J | 66 | 11 | 32 | 22 |
| (Chinese Academy of Sciences) | | | | | | | | |
| 中国科学院： | Z | G | K | Y | 66 | 11 | 23 | 41 |
| 2) | | | | | | | | |
| (People's Republic of China) | | | | | | | | |
| 中华人民共和国： ㅣ乙 丿 ㅣ 丿 ﹅ ㅣ乙 | M | R | W | M | 25 | 32 | 34 | 25 |
| (People's Liberation Army) | | | | | | | | |
| 中国人民解放军： ㅣ乙 ㅣ乙 丿 ﹅ ﹅乙 | M | M | W | P | 25 | 25 | 34 | 45 |
| (Chinese Academy of Sciences) | | | | | | | | |
| 中国科学院： ㅣ乙 ㅣ乙 丿 — 乙 ㅣ | M | M | T | B | 25 | 25 | 31 | 52 |

(If three codes are selected without a repeated one, input with the space bar. If there are any repeated codes, select to input).

Examples of Input procedures of some typical characters: 1. Input procedures of single characters: The following single characters are to be inputted:
编 码 方 案

1). Method 1, when input the character "编",
key in the 1st code: b
display: 1不 2把 3八 4捌 5百 6比 7被 8本 9表 0巴
key in the 2nd code: b j
display: 1散 2边 3编 4眨 5扁 6便 7变 8卞 9辨 0辩
key in the 3rd code: b j 乙乙
display: 1编 2版
key in the 4th code: b j 乙乙 ㅣㅣ
display: 1 编 (automatically entered)
When the character "码" is to be inputted:
key in the 1st code: m
display: 1没 2争 3们 4面 5来 6秒 7庙 9民 0吗
key in the 2nd code: m a
display: 1妈 2麻 3玛 4码 5吗 6马 7骂 8麻 9吗 0呐
key in the 3rd code: m a —丿
display: 1码
key in the 4th code: m a —丿 乙—
display: 1码 (automatically entered)
When the character "方" is to be inputted:
key in the 1st code: f
display: 1发 2放 3法 4份 5分 6凡 7方 8法 9付 0富
key in the 2nd code: f g
display: 1纺 2芳 3方 4防 5房 6仿 7访 8仿 9访 0纺
key in the 3rd code: f g ﹅—
display: 1方 2放 3邡
key in the 4th code: f g ﹅— 丿乙
display: 1方 (automatically entered)
When the character "案" is to be inputted:
key in the 1st code: a display: 1何 2响 3爱 4安 5核 6案 7航 8吊 9臭 0澳
key in the 2nd code: a f
display: 1陕 2岛 3岁 4传 5传 6晤 7岸 8睑 9案 0诸
key in the 3rd code: a f ` `
display: 1安 2案
key in the 4th code: a f " /丶
display: 1案 (automatically entered)
2). Method 2 (fast speed five stroke),
When the character "编" is to be inputted,
key in the first two code: 乙乙 ||
display: 1编 2䲣 3鹄 4䎒
key in the 3rd code: 乙乙 || b
display: 1编
key in the 4th code: 乙乙 || b :
display: 1编 (automatically entered)
When the character "码" is to be inputted:
key in the first two codes: —) 乙—
display: 1厉 2序 3㕧 4册 5㔾 6厚 7㞡 8码 9㝡 0石
key in the 3rd code: —) 乙— m
display: 1码 (automatically entered)
When the character "方" is to be inputted:
key in the 1st code:
display: 1戚 2瘥 3凭 4嬎 5方 6党 7竞 8锐 9元 0尧
key in the 3rd code: — /乙 f g
display: 1方 (automatically entered)
2. Input procedures of double characters:
For example, the following double characters are to be inputted: 汉字 编码
1) Method 1
When the characters "汉字" are to be inputted.
key in the first two codes: h z
display:

1海战2海鳌3鲛子4行长5平交6汗戍7汉字8汉字9号㠪0号于
1黑子2核准3金子4全子5核子6合本7合作8红枣9长炸0孩子
1后坐2延情3旺嘴4花据5花柱6花子7贺兰8湖泽 key in the 3rd code: h z ヽ丶
display: 1海战2海鳌3汗来4子子5汉字6湖泽
key in the 4th code: h z ヽ丶丶丶
display: 1汉字(automatically entered)
When the characters " 编码 " are to be inputted.
key in the first two codes: b m
display:

1白忙2白米3白面4白描5白沐6白㳠马7㧢面8拼面9炮满0包米
1保密2报名3保坪4报幕5北门6北面7戴面8背面9峤㟊0夯马
1奔命2编码3变卖4编5标卖6表抹7表面8表明9到名0逆走
1乞名2㧀墨3㧁令4闭幕5兵马 key in the 3rd code: b m 乙乙
display: 1 编码 2 编目
key in the 4th code: b m 乙乙 —)
display: 1 编码 (automatically entered)
2)Method 2
When the characters "汉字" are to be inputted.
key in the first two codes: h f z
display: 1平交 2仟来 3汉字 4 汉字
key in the 3rd code: h f z i
display: 1汉字2汉字
When the characters "编码" are to be inputted.
key in the first three codes: b j m
display: 1编码2突卖3编目
key in the 4th code: b j m a
display: 1编码(automatically entered)
3)Method 3
When the characters " 汉字 " are to be inputted.
key in the first two codes: " 乙` "
display: 1连状2泛滥3汉字4点点5进字
key in the 4th code: ` 乙` " 乙—
display: 1 汉 (automatically entered)
When the characters " 编码 " are to be inputted.
key in the first three codes: 乙乙 || —)
display: 1 编码
key in the 4th code: 乙乙 || —) 乙—
display: 1编码(automatically entered)
3. Input procedures of three character phrases,
For example, the following three characters phrases are to be inputted:
现代化,自动化,计算机
Method 1: x d h o, z d h o, j s j o
Method 2: —— /l,/l o、/l ——/l o、·乙 /— —|0
4. Input procedures of four character phrases,
For example, the four characters phrases "汉字编码" are to be inputted:
Method 1: h z b m
Method 2: —— /l /l o、/l——/l o、·乙/——|0
4. Input procedures of four character phrases,
For example, the four characters phrases"汉字编码" are to be inputted:
Method 1: h z b m
Method 2: " " 乙乙 —)
5. Input procedures of sentence
For example, the sentence " 汉字编码方案 " are to be inputted,
Method 1: h z b a
Method 2: " " 乙乙 "

I claim:
1. A method for inputting Chinese characters into a computer system having a standard English keyboard, the keyboard including 26 alphabet keys on which Chinese consonants, vowels and 25 stroke combinations of the characters are allocated wherein each stroke combination represents two strokes or codes of two strokes, the characters being coded primarily according to their consonants and vowels or vowel codes, and secondly according to initial two strokes and last two strokes of the characters by using said stroke combination, said method comprising the steps of:

(A) entering single Chinese characters by
a) inputting the consonant of each character,
b) inputting the vowel code of said character,
c) inputting codes of the initial two strokes of said character,
d) inputting codes of the last two strokes of said character; and (B) entering words or phrases of two Chinese characters by,
a) inputting the consonant of the first character of each word,
b) inputting the consonant of the second character,
c) inputting codes of initial two strokes of the first character,
d) inputting codes of last two strokes of the second character.

2. The method according to claim 1, wherein characters having less than four strokes are entered by the following steps:
a) for one-stroke characters "一" and "乙", inputting "YI---" and " YIZZZ ", respectively;
b) for two-stroke characters, inputting the two strokes as codes of the initial two strokes and the last two strokes, c) for three-stroke characters, inputting the first and second stroke as codes of the initial two strokes and inputting the second and third strokes as codes of the last two strokes.

3. A method for inputting Chinese characters into a computer system having a standard English keyboard, the keyboard including 26 alphabet keys on which Chinese consonants, vowels and 25 stroke combinations of the characters are allocated wherein each combination represents two strokes or codes of two strokes, the characters being coded primarily according to their initial two strokes and last two strokes, and secondly according to their consonants and vowels or vowel codes, said method comprising the following steps:

(A) entering single Chinese characters by
   a) inputting codes of the initial two strokes of each character,
   b) inputting codes of the last two strokes of said character,
   c) inputting the consonant of said character, and
   d) inputting a code of vowel of said character;
(B) entering words or phrases of two Chinese characters by
   a) inputting codes of the initial two strokes of the first character of each word or phrase,
   b) inputting codes of the last two strokes of the first character,
   c) inputting codes of the initial two strokes of the second character,
   d) inputting codes of the last two strokes of the second character;
(C) entering words or phrases of three Chinese characters by
   a) inputting codes of the initial two strokes of the first character of each word or phrase,
   b) inputting codes of the initial two strokes of the second character,
   c) inputting codes of the initial two strokes of the third character,
   d) inputting a letter "O"; and
(D) entering words or phrases of four Chinese characters by
   a) inputting codes of the initial two strokes of the first character of each word or phrase,
   b) inputting codes of the initial two strokes of the second character,
   c) inputting codes of the initial two strokes of the third character,
   d) inputting codes of the initial two strokes of the fourth character, and
(E) entering words or phrases of more than four Chinese characters by
   a) inputting codes of the initial two strokes of the first character of each word or phrase,
   b) inputting codes of the initial two strokes of the second character,
   c) inputting codes of the initial two strokes of the third character, and
   d) inputting codes of the initial two strokes of the last character.

4. The method according to claim 3, wherein characters having less than four strokes are entered by the following steps:
   a) for one-stroke characters "—" and "乙", inputting " YI---— " and " YIZZZZ ", respectively;
   b) for two-stroke characters, inputting the two strokes as codes of the initial two strokes and the last two strokes,
   c) for three-stroke characters, inputting the first and second stroke as codes of the initial two strokes and inputting the second and third strokes as codes of the last two strokes.

* * * * *